United States Patent [19]

Yamaguchi

[11] Patent Number: 5,547,383
[45] Date of Patent: Aug. 20, 1996

[54] SIMULATED STEERING APPARATUS FOR USE IN A VEHICLE SIMULATOR

[75] Inventor: Toshiya Yamaguchi, Ohta-ku, Japan

[73] Assignee: Sega Enterprises, Ltd., Tokyo, Japan

[21] Appl. No.: 390,753

[22] Filed: Feb. 17, 1995

[30] Foreign Application Priority Data

Feb. 21, 1994 [JP] Japan .................................. 6-046354

[51] Int. Cl.⁶ .............................. G09B 9/04; G09B 19/16
[52] U.S. Cl. .................................. 434/62; 434/71; 446/7
[58] Field of Search ................................ 434/62, 71, 45; 446/7

[56] References Cited

U.S. PATENT DOCUMENTS

| | | | |
|---|---|---|---|
| 3,031,775 | 5/1962 | Cohen | 434/45 |
| 3,605,334 | 9/1971 | Genin | 446/7 |
| 3,740,870 | 6/1973 | Acker et al. | 434/71 |
| 3,936,955 | 2/1976 | Gruen et al. | |
| 4,320,381 | 3/1982 | Olivier | 434/71 |
| 4,659,313 | 4/1987 | Kuster et al. | 434/45 |
| 4,817,948 | 4/1989 | Simonelli | 434/71 |
| 4,952,152 | 8/1990 | Briggs et al. | 434/62 |
| 5,044,956 | 9/1991 | Behensky et al. | |

FOREIGN PATENT DOCUMENTS

| | | |
|---|---|---|
| 217030 | 4/1990 | Japan . |
| 2271382 | 11/1990 | Japan . |

*Primary Examiner*—Paul J. Hirsch
*Attorney, Agent, or Firm*—Price, Gess & Ubell

[57] ABSTRACT

In the simulated steering apparatus, when a steering wheel is turned right or left from its neutral state, a steering reaction force in a direction opposite to the steering direction is transmitted to an operator. A steering shaft that passes through a case and a panel plate is supported rotatably via housings in which are mounted ball bearings. A steering wheel is attached to the front end of the steering shaft, and a powder clutch and an electric motor are located on either side of the steering shaft. An endless output belt is mounted around a coupled pulley that is fitted over the steering shaft, and a drive pulley for the powder clutch, while an endless input belt is mounted around a coupled pulley for the powder clutch and a drive pulley for the electric motor.

9 Claims, 6 Drawing Sheets

SIMULATED STEERING APPARATUS FOR USE IN A VEHICLE SIMULATOR

BACKGROUND OF THE INVENTION

1. Field of the Invention

The present invention relates to a simulated steering apparatus, for recreation or for driver training, that imitates the steering apparatus of an actual vehicle that is operated by a driver; and in particular, the present invention pertains to a simulated steering apparatus that is so designed that it provides a player or a driving trainee (hereafter referred to as an "operator") steering reaction force in the direction that is the opposite of the steering direction when a steering wheel is shifted from the neutral state either to the right or to the left.

2. Related Arts

In Japanese Unexamined Patent Publication No. Hei 2-271382 is described a conventional simulated steering apparatus that is so designed that it provides an operator the steering reaction force, in the direction opposite to the steering direction, that corresponds to the road surface condition, the travel speed, etc., during simulated driving.

In a simulated steering apparatus, as prior art, that is disclosed in Japanese Unexamined Patent Publication No. Hei 2-271382, a motor is coupled with a steering shaft. Also, since the motor and the steering shaft are coupled together by a transmission mechanism, a torque, which is generated by the motor, is transmitted unchanged to an operator via the steering shaft and a steering wheel.

As the torque of the motor and the rotational speed must therefore be delicately controlled by a computer, a computer having a high performance is required and manufacturing costs for such a simulated steering apparatus are accordingly increased.

SUMMARY OF THE INVENTION

It is an object of the present invention to provide a simulated steering apparatus, which is to be employed in a vehicle simulator, that overcomes the above described conventional shortcomings.

It is another object of the present invention to provide a simulated steering apparatus, employed in a vehicle simulator, that can provide an operator a steering reaction force, in the direction that is the opposite of the steering direction, and that has no backlash due to its a gear mechanism, so that an operator can experience the same sensation as that he would experience were he actually driving an automobile, or another such motor vehicle.

It is an additional object of the present invention to provide a simulated steering apparatus, which is to be employed in a simply structured vehicle simulator, wherein the rotational torque and rotational speed of an electric motor need not be controlled because an endless belt, an electric motor, and a powder clutch are used and the rotational torque of the electric motor is reduced by the steering force of an operator.

It is a further object of the present invention to provide a simulated steering apparatus comprising: a base; a steering shaft, which is supported rotatably by the base, that has a steering wheel integrally formed at one end; a steering direction detection means, for detecting a steering direction of the steering shaft relative to a neutral position of the steering shaft; an electric motor, which is positioned along one side of the steering shaft, that has a rotary shaft provided parallel to the steering shaft; a clutch, which is positioned opposite to the electric motor with the steering shaft in between, that has a rotary shaft provided parallel to the steering shaft; an endless input belt that is mounted around a drive pulley which is integrally formed with the rotary shaft of the motor, and a coupled pulley, which is integrally formed with an input member of the clutch; and control means for rotating the electric motor in a direction opposite to the steering direction of the steering shaft that is detected by the steering direction detection means.

Still other objects of the present invention will become apparent in the course of the following detailed explanation for one embodiment and in the description of the claims of the present invention.

DESCRIPTION OF THE PREFERRED EMBODIMENTS

Figure 1:
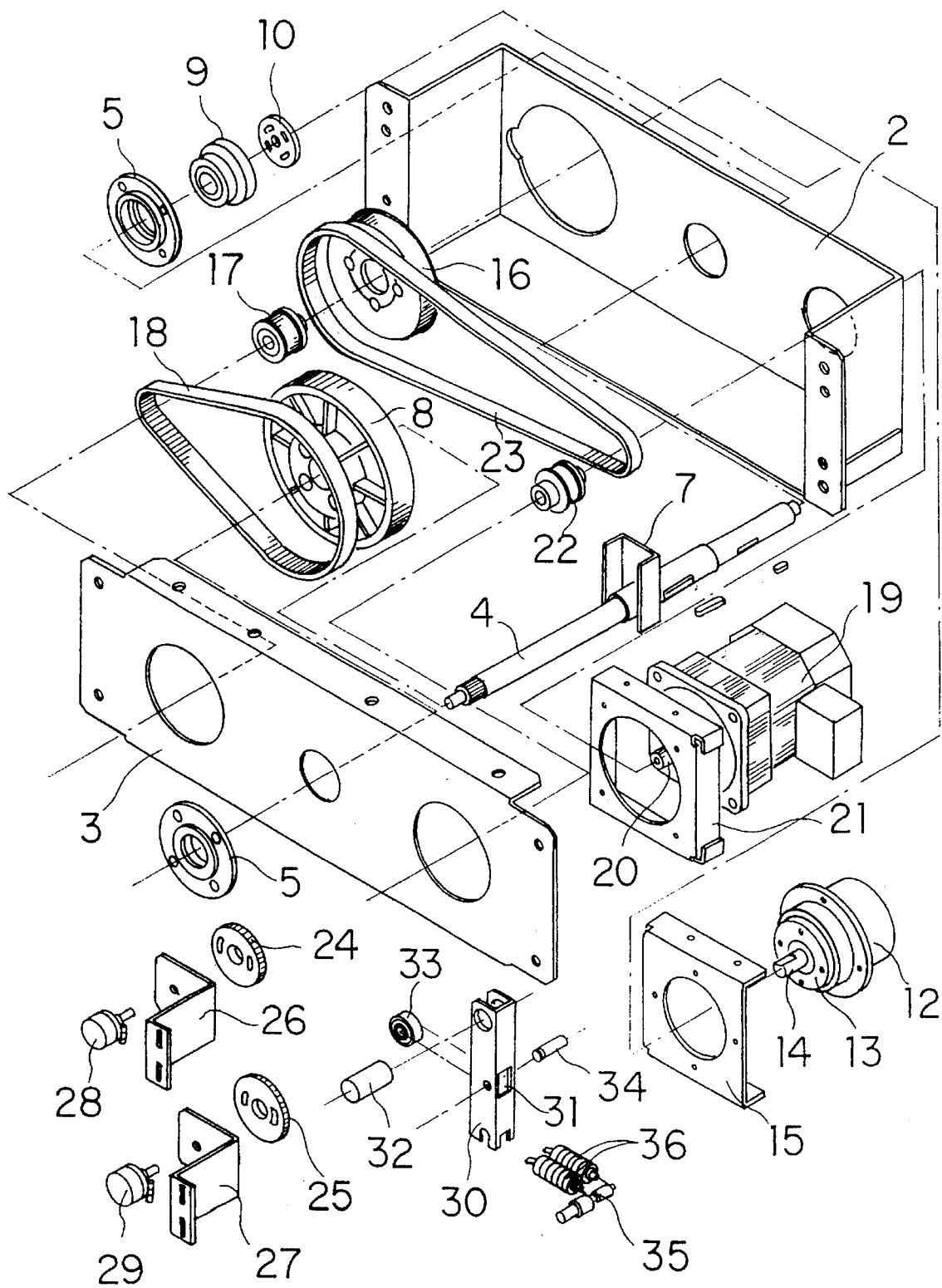
FIG. 1 is an exploded perspective view of a simulated steering apparatus according to one embodiment of the present invention.

The preferred embodiments of the present invention will now be described while referring to the accompanying drawings. In the drawings, the same reference numbers are used to denote corresponding or identical components.

A simulated steering apparatus 1 is installed in an instrument panel in front of a driver's seat of an automobile, one vehicle type, which is not shown in the drawings.

In the simulated steering apparatus 1, a base is formed with a casing 2 that has side faces but no top; and a panel plate 3 that is so attached to the front of the casing 2 that it covers the front face. A steering shaft 4 that passes through the casing 2 and the panel plate 3 is fixed to the casing 2 and the panel 3, and is supported rotatably at housings 5, in each of which is mounted a ball bearing.

A steering wheel 6 is integrally attached to the front end of the steering shaft 4.

An arm 7, a coupled pulley 8, a heart-shaped cam 9, and a steering angle detection drive gear 10 are fitted together on the steering shaft 4. A stopper 11 is secured to the panel plate 3.

Figure 2:
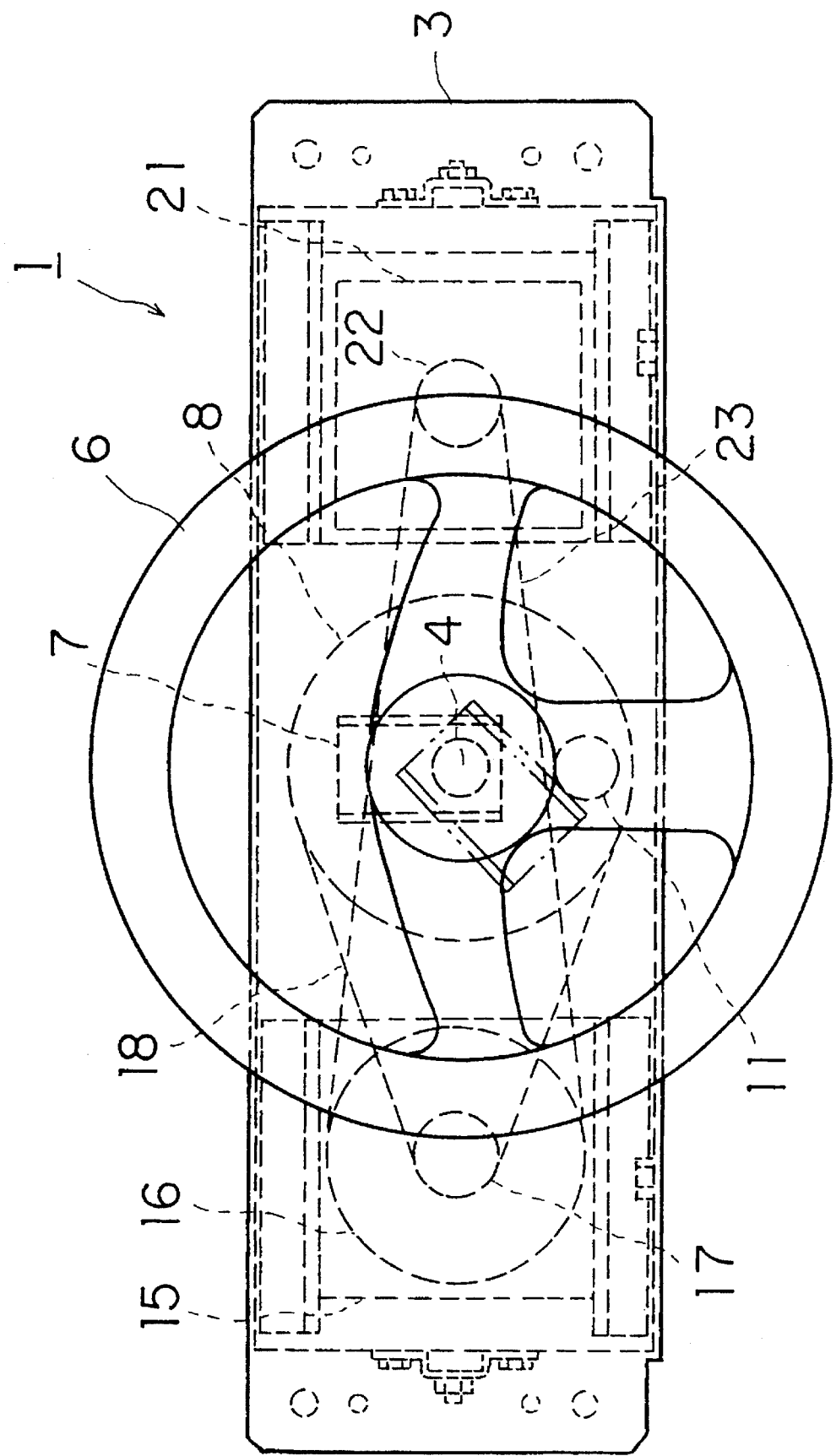
FIG. 2 is a front view of the embodiment of the present invention.

The rotation of the steering wheel 6 and the steering shaft 4 are restricted by the arm 7 and the stopper 11, so that they may be operated within a range of about 135° on one side. This is easily understood by referring to FIG. 2, where the steering wheel 6 and the steering shaft 4 are rotated to left and their rotation is restricted by the stopper 11 to an angle of 135° from the perpendicular position of the arm 7.

A powder clutch 12, in which ferromagnetic powder is retained, is so secured to the casing 2, to the left of the steering shaft 4, by a clutch attachment member 15 that it may be shifted to the right and to the left along the casing 2.

A coupled pulley 16 is secured to a disk 13, which is an input member of the powder clutch 12, while a drive pulley 17, which has a smaller diameter than that of the coupled pulley 16, is fitted over an output shaft 14, which is an output member of the powder clutch 12.

An endless output belt 18 is stretched between and mounted around the coupled pulley 8 on the steering shaft 4, and the drive pulley 17 of the powder clutch 12. When an electric current is fed to the powder clutch 12, the ferromagnetic powder it holds is magnetized and becomes more compact. The input member and the output member of the powder clutch 12 are thus coupled together with the compacted ferromagnetic powder, placing the powder clutch 12 in the engaged state.

A clutch such as one from, for example, Ogura Clutch Co., Ltd., a Japanese maker, may be used as the powder clutch 12. The above described operating principle, which is a common principle of powder clutches, is explained in, for example, FIGS. 3 and 4 in Japanese Examined Patent Publication No. Hei 2-17030.

The above engaged state of the powder clutch 12 can be altered by varying the strength of the magnetizing current that is supplied. Therefore, the transmission torque between the input member and the output member of the powder clutch 12 can be controlled by adjusting the strength of the magnetizing current flowing in the powder clutch 12.

An electric motor 19, which is secured to the casing 2 by a fitting member 21, is positioned opposite the powder clutch 12, with the steering shaft 4 located between them, and can be shifted to the right and to the left along the casing 2.

A drive pulley 22 is fitted over a rotary motor shaft 20 of the electric motor 19. An endless input belt 23 is mounted around the drive pulley 22 and the coupled pulley 16 of the powder clutch 12. The rotational torque of the electric motor 19 is transmitted via the drive pulley 22, the endless input belt 23, and the coupled pulley 16 to the disk 13, which is the input member of the powder clutch 12.

Figure 4:
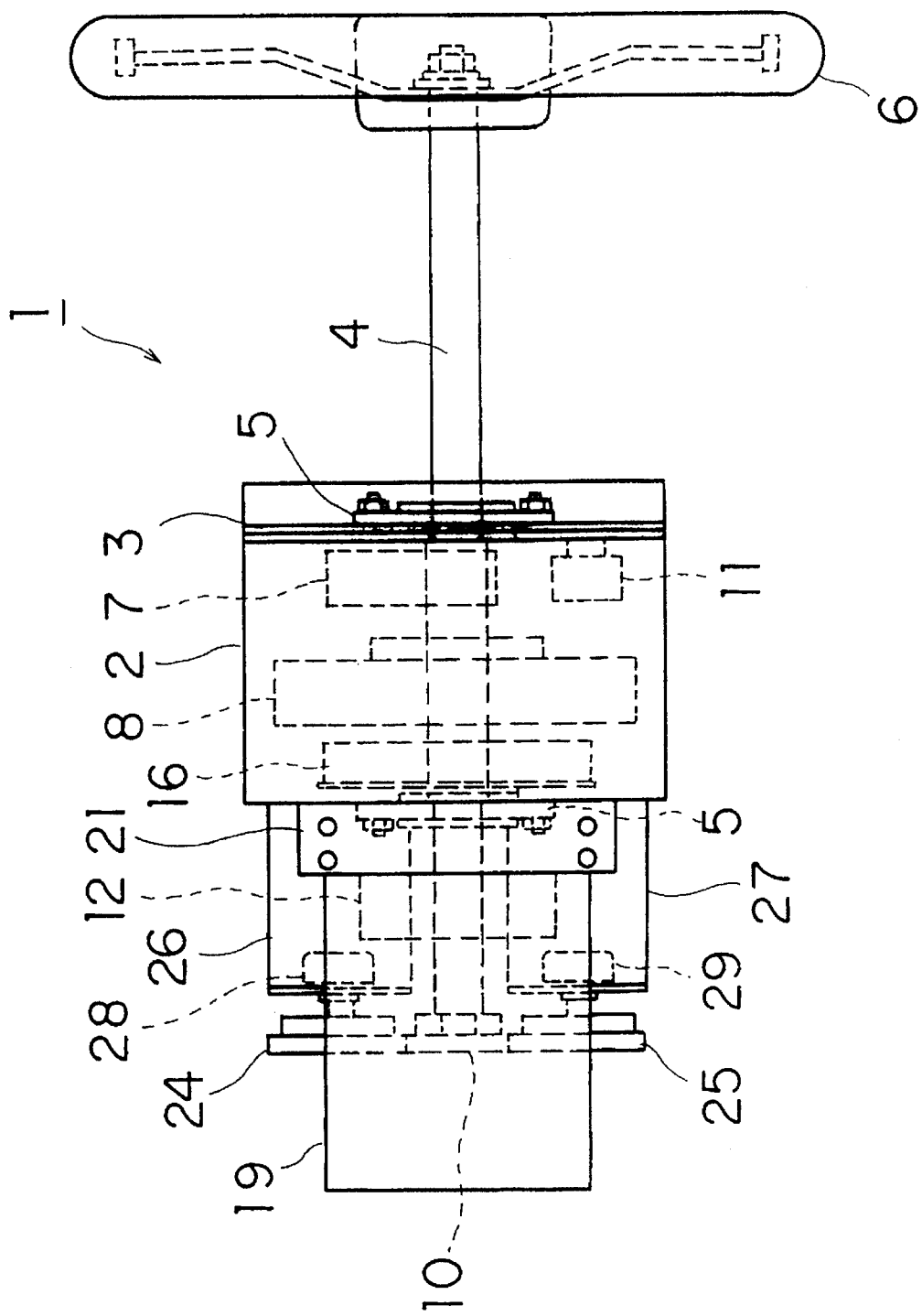
FIG. 4 is a side view of the embodiment of the present invention.
Figure 5:
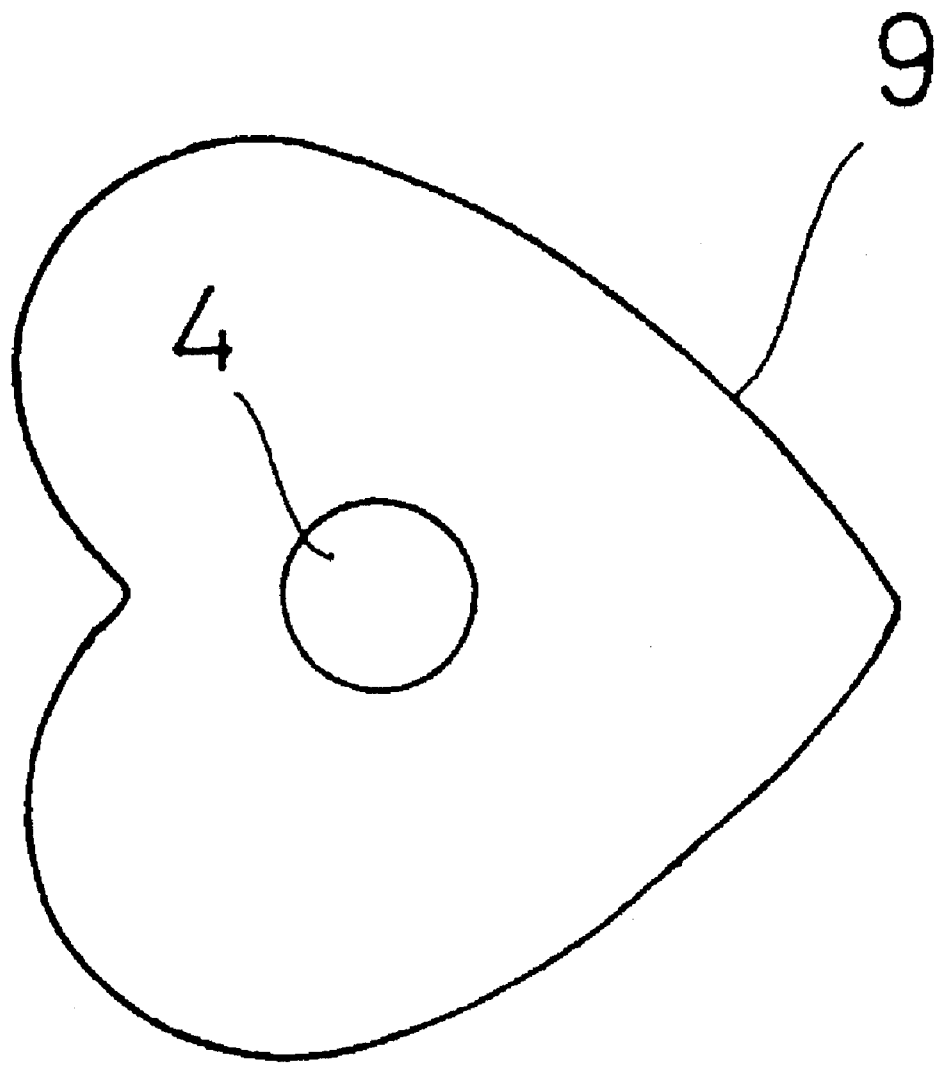
FIG. 5 is a front view of a cam in this embodiment.

In addition, as is shown in the lower portion of FIG. 1 and in the side view in FIG. 4 to enable the structure to be especially easy to understand, gears 24 and 25, which engage the steering angle detection drive gear 10, are attached rotatably to the casing 2 by brackets 26 and 27, respectively, and are positioned above and below the steering angle detection drive gear 10.

The gear 24 is a steering angle detection drive gear, for controlling a motor, while the gear 25 is a steering angle detection drive gear, for controlling a screen, that controls a game screen of a display monitor that accompanies the simulated steering apparatus of the present invention.

A steering angle detection sensor 28, for controlling a motor, and a steering angle detection sensor 29, for controlling a game screen, are respectively provided for the steering angle detection drive gear 24, for controlling a motor, and the steering angle detection drive gear 25, for controlling a screen.

The steering angle detection sensors 28 and 29 are, for example, position meters that incorporate variable resistors. It should be understood that the steering angle detection sensors 28 and 29 are those that indicate electric resistances, which correspond to the degree of rotation of the steering angle detection drive gears 24 and 25, i.e., the steering angle of the steering shaft 4. The steering angle can therefore be detected from the proportion of the electric resistance to a current or a voltage value.

From a detection signal that is emitted by the steering angle detection sensor 28, it can be determined whether the steering shaft 4 has been turned clockwise or counterclockwise. In response to this determination, the electric motor control section, which is provided together with the simulated steering apparatus of the present invention, permits the electric motor 19 to rotate the steering shaft 4 either counterclockwise or clockwise.

Figure 6:
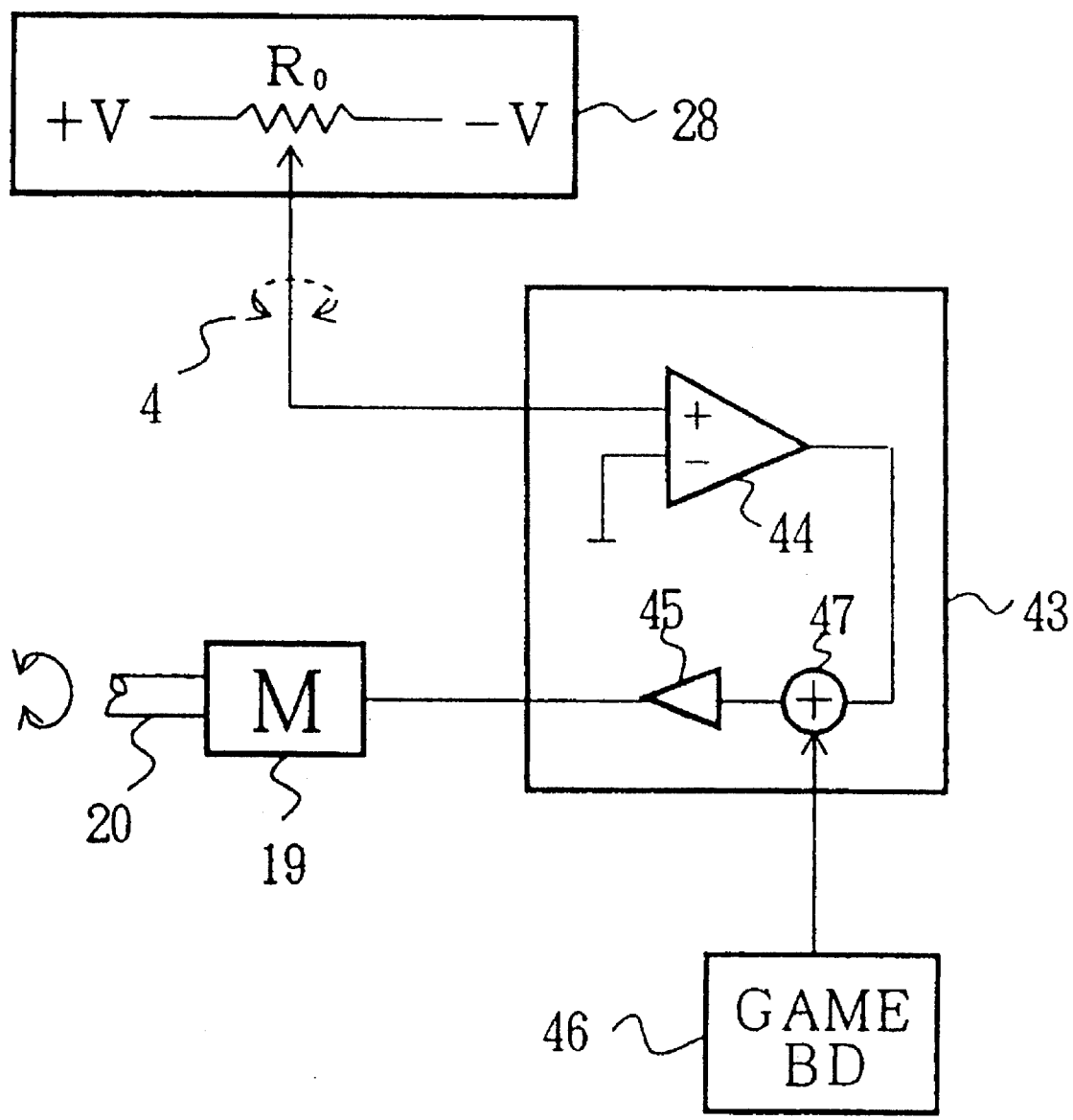
FIG. 6 is a block diagram illustrating a control section that drives an electric motor in the embodiment.

The above described relationship will be explained further while referring to an equivalent circuit block diagram in FIG. 6. Shown as an example is a position meter that is equivalent to the steering angle detection sensor 28.

More specifically, positive and negative voltages are supplied to the ends of a resistor R0, and a voltage that corresponds to the position of a movable tap is output. The position of the movable tap is determined in consonance with the steering angle of the steering shaft 4, which is transmitted via the steering angle detection drive gear 24.

The output of the steering angle detection sensor 28, i.e., a voltage that is output by the movable tap and that corresponds to the steering angle of the steering shaft 4, is sent to an electric motor control section 43. The control section 43 includes an operational amplifier 44, which compares the output of the steering angle detection sensor 28 with a reference voltage (an electric potential existing when the steering wheel is in the neutral position) and outputs a differential voltage, and a power voltage amplifier 45, which inverts the output of the operational amplifier 44 and amplifies the inverted output.

A game control signal is supplied to an adder 47 from a game board, and the game control signal is varied according to progression of a game, such as driving game to add more fun to a driver. The adder adds the control signal to the differential voltage and outputs the added signal as a drive voltage.

The power voltage amplifier 45, therefore, outputs the drive voltage that is employed to rotate the shaft of the electric motor 19 in that direction in which the reaction force is to be provided relative to the steering angle direction of the steering shaft 4. When it is determined that with this drive voltage the steering shaft 4 has been rotated either clockwise or counterclockwise, the electric motor 19 is so controlled that it rotates the steering shaft 4 either counterclockwise or clockwise.

An automatic recovery lever 30, which is positioned near the casing 2 and to the left of and adjacent to the cam 9, is so supported by a shaft 32 that it can swing freely. A cam follower 33 is so supported within the automatic recovery lever 30, by a pin 34, that a portion of the cam follower 33 protrudes through a window 31 that is formed in the right wall of the automatic recovery lever 30.

Helical tension springs 36 are installed between a pin 35, which is attached to the casing 2, and the bottom end of the automatic recovery lever 30 to provide tension. As the helical tension springs 36 contract, the force exerted by this contraction presses the cam follower 33 against the surface of the cam 9 so that the cam follower 33 engages the recessed portion of the heart-shaped cam 9. When the powder clutch 12 or the electric motor 19 is deactivated, the force exerted by the spring contraction permits the steering shaft 4 and the steering wheel 6 to be automatically returned to their neutral positions.

Figure 3:
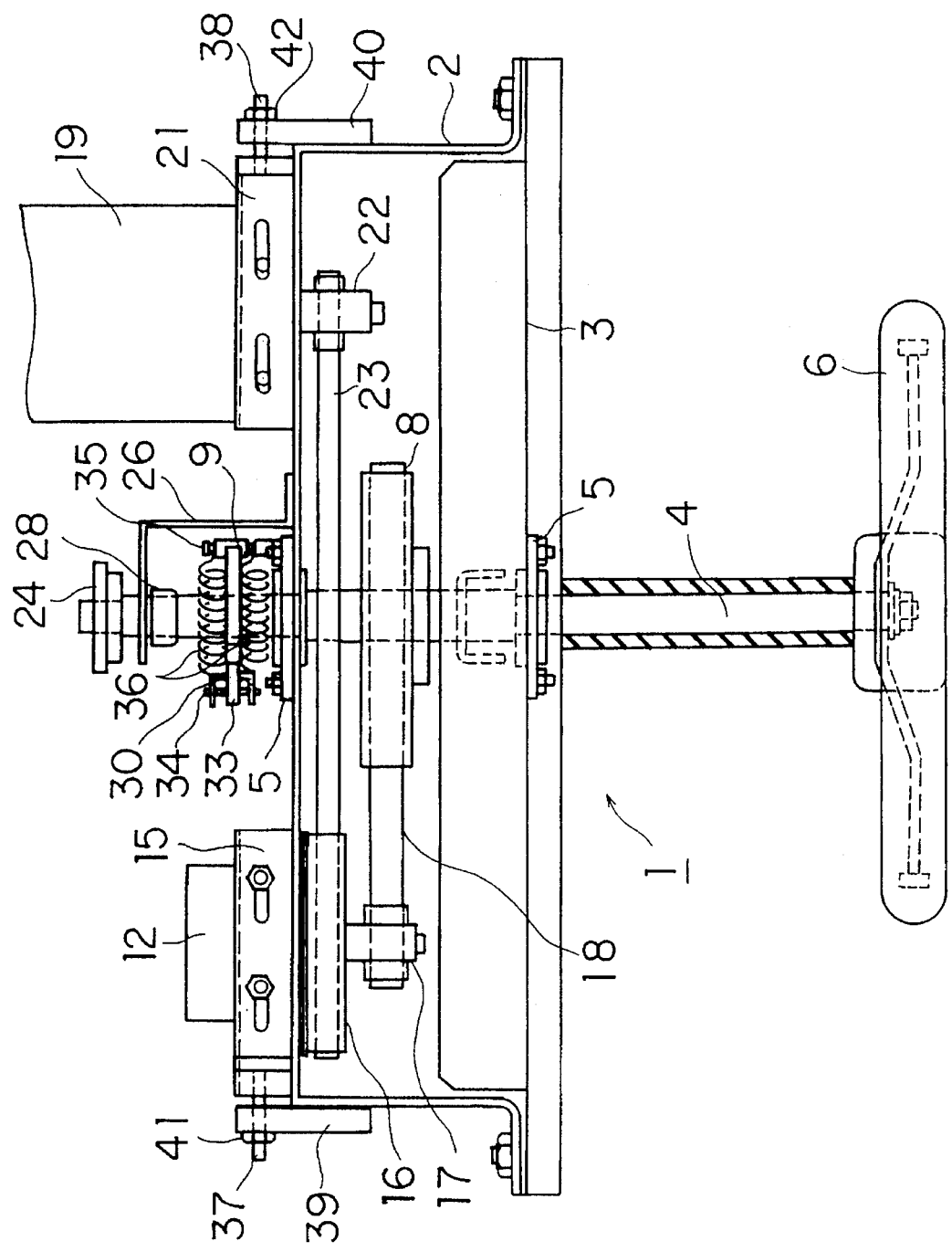
FIG. 3 is a plan view of the embodiment of the present invention.

As is shown in FIG. 3, adjustment screws 37 and 38 are fixed respectively to the left side of the attachment member 15 for the powder clutch 12 and the right side of the attachment member 21 for the electric motor 19. The adjustment screws 37 and 38 pass through respective reception pieces 39 and 40 that are integrally formed with the casing 2, and nuts 41 and 42 are threaded onto the distal ends of the respective adjustment screws 37 and 38.

With the above described structure in this embodiment, when no current is fed to the powder clutch 12 and its input member and its output member are disengaged, the cam follower 33 is pressed against the cam 9 by the contraction of the helical tension springs 36, so that when the steering shaft 4 and the steering wheel 6 are turned either clockwise or counterclockwise from the neutral position, they can be automatically returned to the neutral position.

In addition, when no current is fed to the powder clutch 12 and it is thus in the disengaged state, and the steering wheel 6 is turned clockwise or counterclockwise, upon the reception of a detection signal from the steering angle detection sensor 28, the previously described electric motor control section rotates the electric motor 19 counterclockwise or clockwise. The rotational torque, however, is not transmitted to the steering shaft 4 and the steering wheel 6.

On the contrary, when the powder clutch 12 becomes conductive and is in the engaged state, and the steering wheel 6 is rotated clockwise or counterclockwise, the electric motor control section is activated in response to a signal from the steering angle detection sensor 28, which detects the steering direction of the steering wheel 6. In consonance with a control signal from the control section, the electric motor 19 is rotated counterclockwise or clockwise in the direction that is the opposite of the steering direction of the steering wheel 6.

The rotational torque is transmitted to the steering wheel 6 via the drive pulley 22, the endless input belt 23, the coupled pulley 16, the powder clutch 12, the drive pulley 17, the endless output belt 18, the coupled pulley 8, and the steering shaft 4. An operator, therefore, is provided with a steering load in the direction that is the opposite of the direction in which he is steering, and as there is no backlash due to a gear mechanism, the sensation is the same as what he would experience when actually diving an automobile.

The rotary shaft 20 of the electric motor 19 is connected to the steering shaft 4 of the steering wheel 6 via an input belt transmission mechanism, which includes the drive pulley 22, the endless input belt 23, and the coupled pulley 16, and an output belt transmission mechanism, which includes the powder clutch 12, the drive pulley 17, the output endless belt 18, and the coupled pulley 8. The rotational torque of the electric motor 19 is reduced by slippage in these mechanisms that is in consonance with the steering force exerted by an operator when turning the steering wheel 6. Therefore, unlike a conventional arrangement wherein the steering shaft 4 is directly coupled to the transmission motor 19, this invention does not require that the rotational torque and the rotational speed of the electric motor 19 be controlled. The structure of the control means is substantially simplified, which makes it possible to manufacture the simulated steering apparatus 1 at a low cost.

When the steering force exerted on the steering wheel 6 is reduced after an operator has turned it in one direction, the steering wheel 6 is returned to its initial, neutral position by the force of the electric motor 19 that acts in the opposite direction. At this time, since the value of the detection signal output by the steering angle detection sensor 28 drops to zero and the electric motor 19 is halted, a sensation is acquired that is equivalent to that which is experienced when actually steering an automobile.

By rotating the adjustment screws as needed, the degree of tension placed on the endless output belt 18 and the endless input belt 23 can be increased and decreased to provide proper slippage for the belt transmission mechanisms, and an adequate steering reaction force can be acquired.

Further, by increasing and decreasing the magnetizing current supplied to the powder clutch 12, the steering reaction force can be more delicately controlled.

The structure of the present invention has been explained according to the embodiment, and its operation will now be described.

When an operator turns the steering wheel 6 clockwise or counterclockwise, the control means 43 receives a steering direction detection signal from the steering direction detection means 28 and permits the electric motor 19 to rotate in a direction opposite to the steering direction. The rotational torque of the electric motor 19 is transmitted from the drive pulley 22, which is fitted over the clutch input member 13, to the endless input belt 23, to the coupled pulley 16, which is fitted over the clutch input member 13, to the powder clutch 12, to the drive pulley 17, which is fitted over the clutch output member 14, to the endless output belt 18, to the coupled pulley 8, which is fitted over the steering shaft 4, to the steering shaft 4, and to the steering wheel 6.

In the present invention, since the rotational torque of the electric motor 19 is transmitted to the steering wheel 6 via the two belt transmission mechanisms, each of which includes pulleys and an endless belt, and to the powder clutch 12, the rotational torque of the electric motor 19 is reduced as needed by slippage that occurs in the belt transmission mechanisms and the powder clutch 12. Consequently, the rotational torque and the rotational speed of the electric motor 19 need not be controlled precisely, the control means is simplified, and the manufacturing costs can be substantially reduced.

Further, according to the present invention, the tension placed on the endless input belt 23, which is stretched between the electric motor 19 and the powder clutch 12, and the tension placed on the endless output belt 18, which is stretched between the powder clutch 12 and the steering shaft 4, can be freely adjusted, so that the steering reaction force of the electric motor 19 relative to the steering wheel 6 can be adequately controlled.

In addition, according to the present invention, when the operation of the control means 43 and the electric motor 19 is halted, the steering shaft 4 and the steering wheel 6 can be automatically returned to their neutral positions by an automatic recovery mechanism that is mainly constituted by the cam 9. Therefore, driving force can be provided to drive a vehicle straight forward at the start of driving simulation, or, in the case of a vehicle that is displayed on a display monitor, a signal for the display on a game screen of a vehicle that is running straight forward can be acquired from the steering angle detection sensor 29.

The above described embodiment is employed to provide an explanation of the present invention, and the scope of the present invention is not therefore limited to this embodiment. Further, equivalent embodiments of the present invention that are described in the claims also fall within the scope of the present invention.

What is claimed is:

1. A simulated steering apparatus for use in a vehicle simulator comprising:

a base;

a steering wheel;

a steering shaft, which is coupled to said steering wheel at one end and is supported rotatably at said base;

steering direction detection means for detecting a steering direction relative to a neutral position of said steering shaft;

an electric motor having a rotary shaft that is positioned in parallel to said steering shaft;

a clutch, having an input member and an output member that are parallel to said steering shaft;

a first drive pulley, which is fitted over a rotary shaft of said electric motor;

a first coupled pulley, which is fitted over said input member of said clutch;

an endless input belt that is mounted around said first drive pulley and said first coupled pulley;

a second drive pulley, which is fitted over said output member of said clutch;

a second coupled pulley, which is fitted over said steering shaft;

an endless output belt that is mounted around said second drive pulley and said second coupled pulley; and control means for controlling the rotation of said electric motor in a direction that is the opposite of said steering direction of said steering shaft, which is detected by said steering direction detection means.

2. A simulated steering apparatus according to claim 1, wherein said electric motor and said clutch are so attached to said base that distances from said electric motor and said clutch to said steering shaft are adjustable.

3. A simulated steering apparatus according to claim 1, further comprising automatic recovery means for returning said steering shaft to said neutral position.

4. A simulated steering apparatus according to claim 3, wherein said automatic recovery means has a heart-shaped cam, which has a recessed portion, that is coupled to the other end of said steering shaft, a cam follower, and a tension mechanism that provides that tension which is required to press said cam follower against said recessed portion.

5. A simulated steering apparatus for use in a vehicle simulator comprising:

a base;

a steering wheel;

a steering shaft, which is coupled to said steering wheel at one end and is supported rotatably at said base;

steering direction detection means for detecting a steering direction relative to a neutral position of said steering shaft;

an electric motor, which is provided to one side of said steering shaft and which has a rotary shaft that is positioned parallel to said steering shaft;

a powder clutch, which is provided opposite said electric motor, with said steering shaft located in between, that has an input shaft and an output shaft, which are parallel to said steering shaft, and that holds ferromagnetic powder between said input shaft and said output shaft;

a first drive pulley, which is fitted over a rotary shaft of said electric motor;

a first coupled pulley, which is fitted over said input shaft of said powder clutch;

an endless input belt that is mounted around said first drive pulley and said first coupled pulley;

a second drive pulley, which is fitted over said output shaft of said powder clutch;

a second coupled pulley, which is fitted over said steering shaft;

an endless output belt that is mounted around said second drive pulley and said second coupled pulley; and control means for rotating said electric motor in a direction that is the opposite of said steering direction of said steering shaft, which is detected by said steering direction detection means.

6. A simulated steering apparatus for use in a vehicle simulator comprising:

a base;

a steering wheel;

a steering shaft, which is coupled to said steering wheel at one end and is supported rotatably at said base;

a clutch having an input member and an output member;

an electric motor, which is rotatable in a forward and a reverse direction;

first rotation transmission means, which is coupled between said steering shaft and said input member of said clutch, for transmitting the rotation of said steering shaft to said input member; and second rotation transmission means, which is coupled between a rotary shaft of said electric motor and said output member of said clutch, for transmitting the rotation of said rotary shaft of said electric motor to said output member.

7. A simulated steering apparatus according to claim 6, wherein said first rotation transmission means and said second rotation transmission means are endless belts.

8. A simulated steering apparatus according to claim 6, wherein said input member and said output member of said clutch are rotary bodies that are concentrically positioned, wherein said clutch is a powder clutch that has ferromagnetic powder between said input member and said output member, and wherein the coupling force of said input member and said output member is controlled in consonance with the magnitude of magnetization of said ferromagnetic powder.

9. A simulated steering apparatus according to claim 6, further comprising detection means, for detecting a steering direction of said steering shaft relative to a neutral position of said steering wheel, and control means for rotating said electric motor in a direction that is the opposite of said steering direction of said steering shaft, which is detected by said detection means.

* * * * *